(12) United States Patent
Hoh et al.

(10) Patent No.: US 11,210,957 B2
(45) Date of Patent: Dec. 28, 2021

(54) SYSTEMS AND METHODS FOR GENERATING VIEWS OF UNMANNED AERIAL VEHICLES

(71) Applicant: Toyota Motor Engineering & Manufacturing North America, Inc., Plano, TX (US)

(72) Inventors: Baik Hoh, Campbell, CA (US); Seyhan Uçar, Mountain View, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 263 days.

(21) Appl. No.: 16/410,134

(22) Filed: May 13, 2019

(65) Prior Publication Data
US 2020/0365040 A1    Nov. 19, 2020

(51) Int. Cl.
*G08G 5/00* (2006.01)
*H04N 7/18* (2006.01)
*B64C 39/02* (2006.01)

(52) U.S. Cl.
CPC ......... *G08G 5/0082* (2013.01); *B64C 39/024* (2013.01); *G08G 5/0039* (2013.01);
(Continued)

(58) Field of Classification Search
CPC .. G08G 5/0082; G08G 5/0069; G08G 5/0039; B64C 39/024; B64C 2201/146; H04N 7/181
See application file for complete search history.

(56) References Cited

U.S. PATENT DOCUMENTS 9,741,255 B1 * 8/2017 Navot ................. G08G 5/0078
9,858,822 B1    1/2018 Gentry
(Continued)

FOREIGN PATENT DOCUMENTS

| CN | 106791613 A | 5/2017 |
| WO | 2015165303 A1 | 11/2015 |
| WO | 2016015311 A1 | 2/2016 |

OTHER PUBLICATIONS

Alan Perlman; "Inside BVLOS, The Drone Industry's Next Game-Changer"; Online Article; Feb. 16, 2017 URL: https://uavcoach.com/inside-bvlos/.

*Primary Examiner* — Peter D Nolan
*Assistant Examiner* — Wae L Louie
(74) *Attorney, Agent, or Firm* — Dinsmore & Shohl LLP

(57) ABSTRACT

A method for generating a view for an unmanned aerial vehicle is provided. The method includes obtaining an origin and a destination of the unmanned aerial vehicle, determining a group of imaging devices based on a route between the origin and the destination of the unmanned aerial vehicle, and obtaining a view of the unmanned aerial vehicle following the route based on images of the unmanned aerial vehicle captured by the group of imaging devices. The group of imaging devices form one or more collaborative camera sensor networks. The collaborative camera sensor networks identify an unmanned aerial vehicle and create human operator's view of the unmanned aerial vehicle. The route of the unmanned aerial vehicle is determined based on the availability of imaging devices of the camera sensor network. The route of the unmanned aerial vehicle may be changed based on the availability of imaging devices.

18 Claims, 10 Drawing Sheets

(52) U.S. Cl.
CPC ........... *G08G 5/0069* (2013.01); *H04N 7/181* (2013.01); *B64C 2201/146* (2013.01)

(56) References Cited

U.S. PATENT DOCUMENTS

| | | |
|---|---|---|
| 9,886,863 B2 | 2/2018 | Kuhara |
| 2015/0371543 A1 | 12/2015 | Amodio et al. |
| 2016/0117933 A1 | 4/2016 | Chan et al. |
| 2016/0291593 A1* | 10/2016 | Hammond .............. G01S 17/86 |
| 2017/0032586 A1* | 2/2017 | Cheatham, III .. H04M 1/72457 |
| 2017/0032587 A1* | 2/2017 | Cheatham, III ....... G07C 5/008 |
| 2018/0005534 A1* | 1/2018 | Jesudason .............. B64D 47/08 |
| 2018/0275654 A1 | 9/2018 | Merz et al. |

\* cited by examiner

SYSTEMS AND METHODS FOR GENERATING VIEWS OF UNMANNED AERIAL VEHICLES

TECHNICAL FIELD

The present specification generally relates to systems and methods for generating a view of an unmanned aerial vehicle and, more specifically, to systems and methods for generating a view of an unmanned aerial vehicle based on available imaging devices that are selected based on the route of the unmanned aerial vehicle.

BACKGROUND

Unmanned aerial vehicles are used in various industries including agriculture, security and surveillance, delivery of goods and services, and telecommunication. However, Federal Aviation Administration regulations (e.g., restricted zones, line-of-sight of human operator restrictions, see-and-avoid requirements, etc.) limit the functionality of unmanned aerial vehicles. Particularly, when an unmanned aerial vehicle flies a long-distance, the unmanned aerial vehicle may be subject to extensive restricted zones and be out of line-of-sight of a human operator, which may fail to meet the see-and-avoid requirement.

Accordingly, a need exists for obtaining a real-time view of an unmanned aerial vehicle traveling a long distance.

SUMMARY

In one embodiment, a method for generating a view for an unmanned aerial vehicle is provided. The method includes obtaining an origin and a destination of the unmanned aerial vehicle, determining a group of imaging devices based on a route between the origin and the destination of the unmanned aerial vehicle, and obtaining a view of the unmanned aerial vehicle following the route based on images of the unmanned aerial vehicle captured by the group of imaging devices.

In another embodiment, a system for generating a view for an unmanned aerial vehicle is provided. The system includes an electronic control unit configured to: obtain an origin and a destination of the unmanned aerial vehicle, determine a group of imaging devices based on a route between the origin and the destination of the unmanned aerial vehicle, receive images captured by the group of imaging devices, and obtain a view of the unmanned aerial vehicle following the route based on the received images.

In yet another embodiment, a method for generating a view for an unmanned aerial vehicle is provided. The method includes determining a route for the unmanned aerial vehicle based on a current location of the unmanned aerial vehicle, selecting a group of imaging devices based on the route, and obtaining a view of the unmanned aerial vehicle following the route based on images captured by the group of imaging devices.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
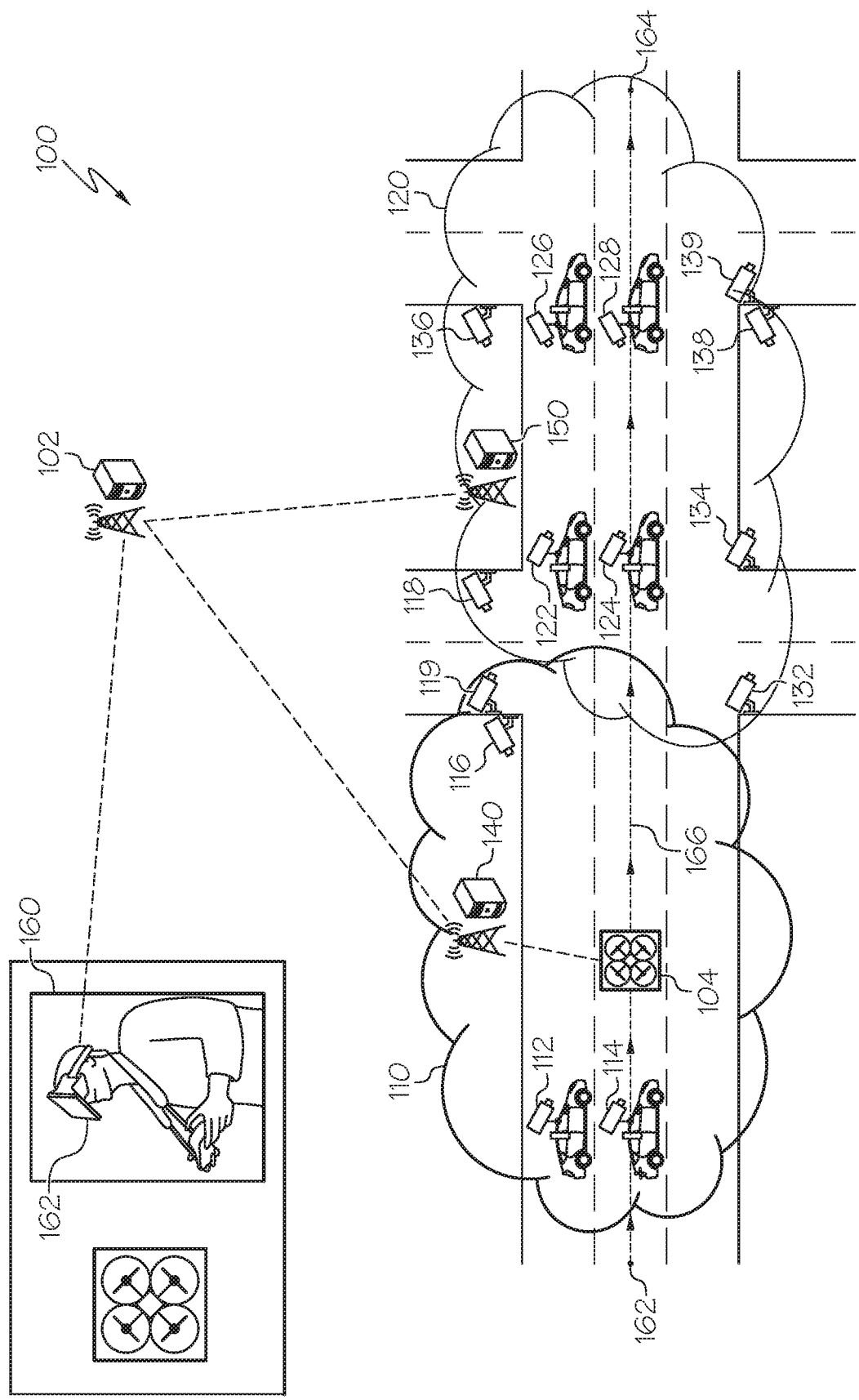
FIG. 1 depicts, a system for generating a view of an unmanned aerial vehicle using camera sensor networks, according to one or more embodiments shown and described herein.
Figure 5:
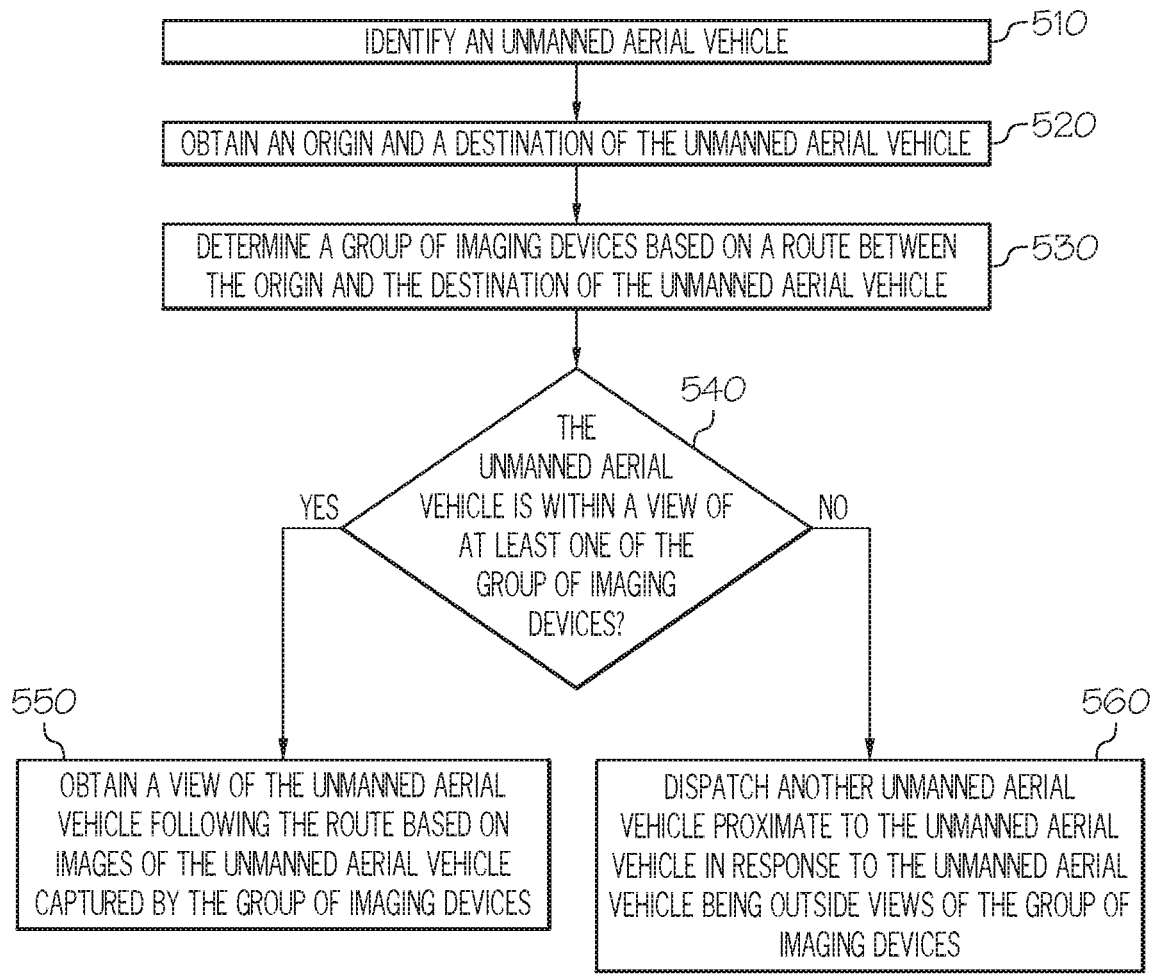
FIG. 5 is a flowchart for obtaining a view of an unmanned aerial vehicle using camera sensor networks, according to one or more embodiments shown and described herein.

The embodiments disclosed herein include systems and methods for obtaining a real time view of an unmanned aerial vehicle. Referring generally to FIGS. 1 and 5, a method for generating a view for an unmanned aerial vehicle is provided. The method includes obtaining an origin 162 and a destination 164 of the unmanned aerial vehicle 104, determining a group of imaging devices based on a route between the origin 162 and the destination 164 of the unmanned aerial vehicle 104, and obtaining a view of the unmanned aerial vehicle following the route based on images of the unmanned aerial vehicle captured by the group of imaging devices.

Figure 3:
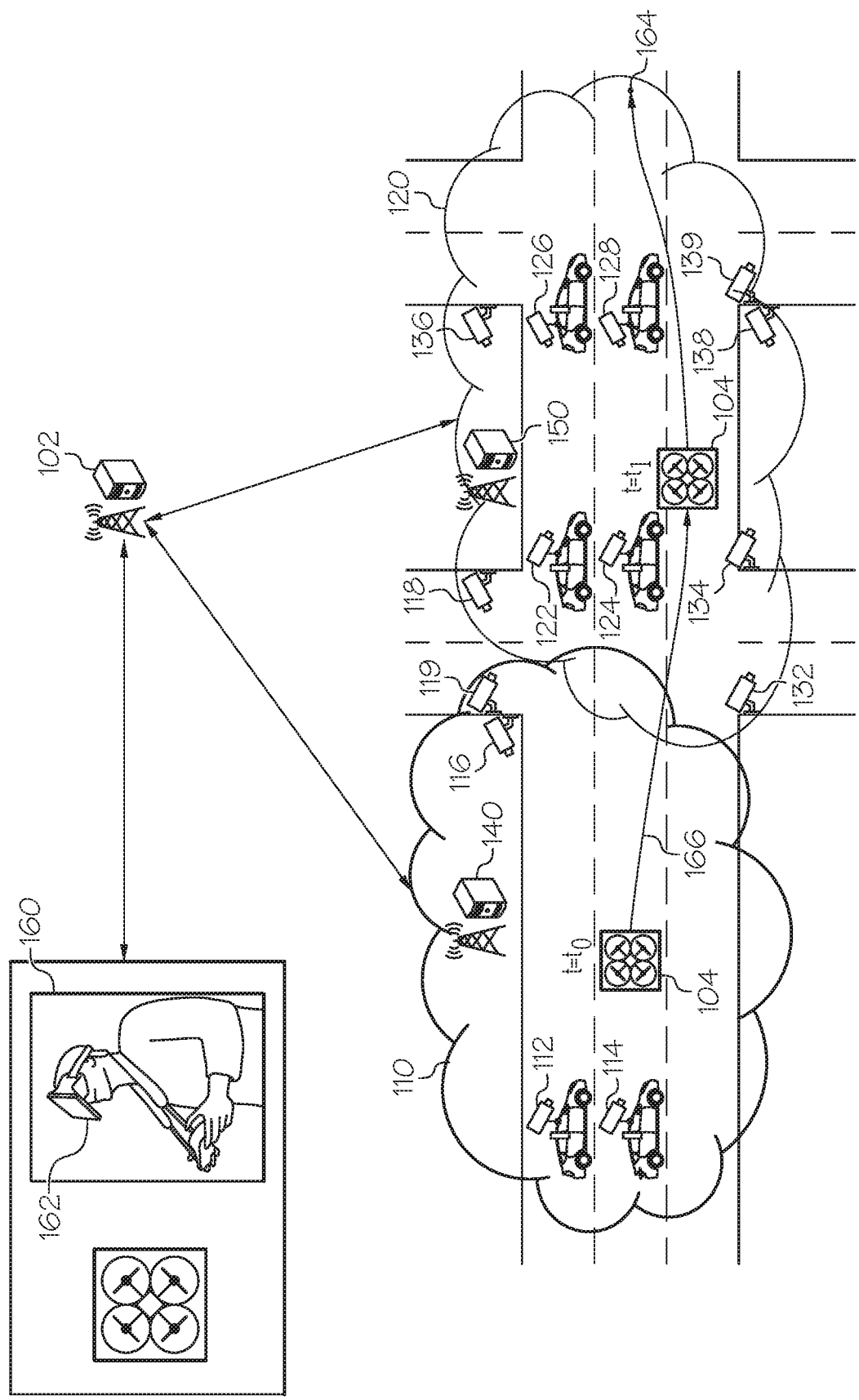
FIG. 3 depicts a handover between camera sensor networks, according to one or more embodiments shown and described herein.
Figure 4:
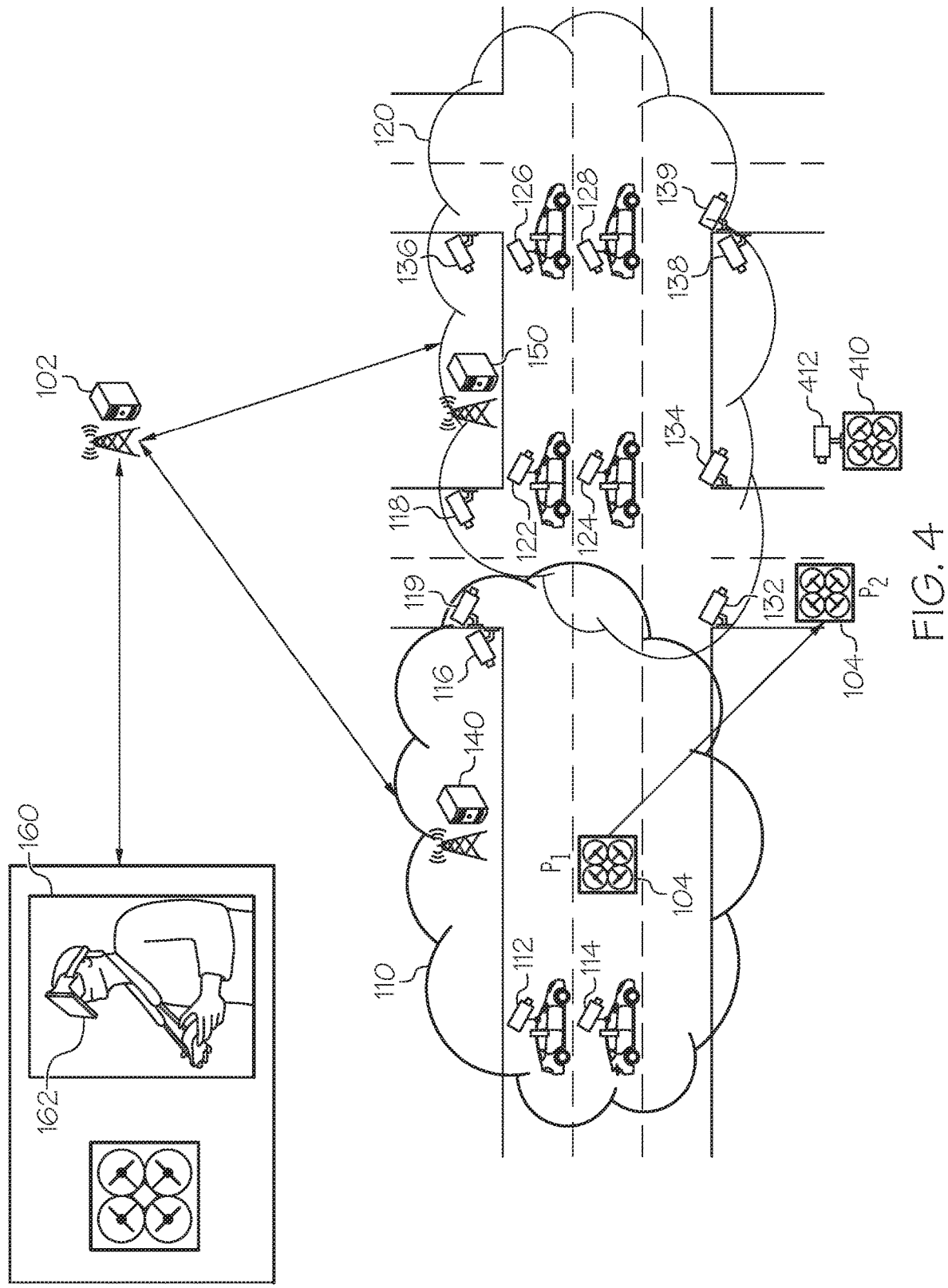
FIG. 4 depicts an exemplary scenario where an unmanned aerial vehicle moves out of camera sensor networks, according to one or more embodiments shown and described herein.

The group of imaging devices form one or more collaborative camera sensor networks. The collaborative camera sensor networks identify an unmanned aerial vehicle and create a human operator's view of the unmanned aerial vehicle. The route of the unmanned aerial vehicle is determined based on the availability of imaging devices of the camera sensor network. The route of the unmanned aerial vehicle may be changed based on the availability of imaging devices. Whenever the unmanned aerial vehicle moves out of a camera sensor network region, horizontal and/or vertical hand over is performed between camera sensor networks as shown in FIG. 3 to continuously monitor the flight of the unmanned aerial vehicle. If the unmanned aerial vehicle is at a location not covered by a camera sensor network, a special mission drone may be positioned proximate to the unmanned aerial vehicle as shown in FIG. 4. The image data obtained by the camera sensor networks is transferred to an edge server and/or a cloud server, which in turn transmits the captured images to a human operator.

FIG. 1 depicts, a system for generating a view of an unmanned aerial vehicle using camera sensor networks, according to one or more embodiments shown and described herein. In FIG. 1, a system 100 may include a cloud server 102, an unmanned aerial vehicle 104, edge servers 140 and 150, and camera sensor networks 110 and 120.

A user 160 of the unmanned aerial vehicle 104 is located remotely from the unmanned aerial vehicle 104. The user 160 may remotely control the unmanned aerial vehicle 104 based on a view of the unmanned aerial vehicle received from camera sensor networks, e.g., the camera sensor network 110.

In embodiments, the unmanned aerial vehicle 104 may share its origin and destination information with an edge server and/or a cloud server. For example, the unmanned aerial vehicle 104 may transmit its origin 162 and destination 164 to a nearby edge server, e.g., the edge server 140, or to the cloud server 102. The edge server 140 and/or cloud server 102 may dynamically form one or more collaborative camera sensor networks based on a route between the origin 162 and destination 164 of the unmanned aerial vehicle 104 and available imaging devices. For example, in FIG. 1, first and second collaborative camera sensor networks 110 and 120 are formed. The first collaborative camera sensor network 110 includes a plurality of imaging devices. For example, the first collaborative camera sensor network 110 includes imaging devices 112 and 114 of moving vehicles, and road-side imaging devices 116, 118, and 119. The second collaborative camera sensor network 120 includes imaging devices 122, 124, 126, and 128 of moving vehicles, and road-side imaging devices 132, 134, 136, 138, and 139.

As the unmanned aerial vehicle 104 travels from the origin 162 to the destination 164 following the route 166, a view of the unmanned aerial vehicle 104 is obtained based on images of the unmanned aerial vehicle 104 captured by a plurality of imaging devices of collaborative camera sensor networks. For example, the imaging device 114 may initiate capturing of the unmanned aerial vehicle 104 as the unmanned aerial vehicle 104 travels following the route 166. The imaging device 114 may constantly transmit captured images to the edge server 140 or the cloud server 102 which in turn transmits the captured images to the user 160 (e.g., a device 163 of the user 160). When the unmanned aerial vehicle 104 comes proximate to the road-side imaging device 116 (e.g., when the unmanned aerial vehicle 104 is within a viewing distance of the road-side imaging device 116), the road-side imaging device 116 may capture images of the unmanned aerial vehicle 104 and transmit the images to the edge server 140 or the cloud server 102 which in turn transmits the images to the user 160.

In embodiments, more than one imaging device may capture images of the unmanned aerial vehicle 104 at the same time. For example, both the imaging device 114 and the imaging device 116 may capture images of the unmanned aerial vehicle 104 at the same time from different perspectives. Both the imaging devices 114 and 116 may transmit captured images to the edge server 140. The edge server 140 may synthesize the images to obtain an enhanced view of the unmanned aerial vehicle 104 (e.g., a 360 degree view of the unmanned aerial vehicle 104). Alternatively, the edge server 140 transmits the captures images to the cloud server 102, and the cloud server 102 may synthesize the images to obtain an enhanced view of the unmanned aerial vehicle 104.

In embodiments, the edge servers 140 or 150 or the cloud server 102 processes the images captured by the imaging devices and determines whether the unmanned aerial vehicle 104 shows any unusual actions. If it is determined that the unmanned aerial vehicle 104 shows any unusual actions, the edge server 140 or 150 or the cloud server 102 may transmit an alert to the user 160. In some embodiments, the edge server 140 or 150 or the cloud server 102 may determine the current location of the unmanned aerial vehicle 104 based on captured images and determine whether the unmanned aerial vehicle 104 is within in a restricted zone based on the location and pre-stored information about restricted zones. If it is determined that the unmanned aerial vehicle 104 is within a restricted zone, the edge server 140 or 150 or the cloud server 102 may transmit an alert to the user 160.

Figure 2:
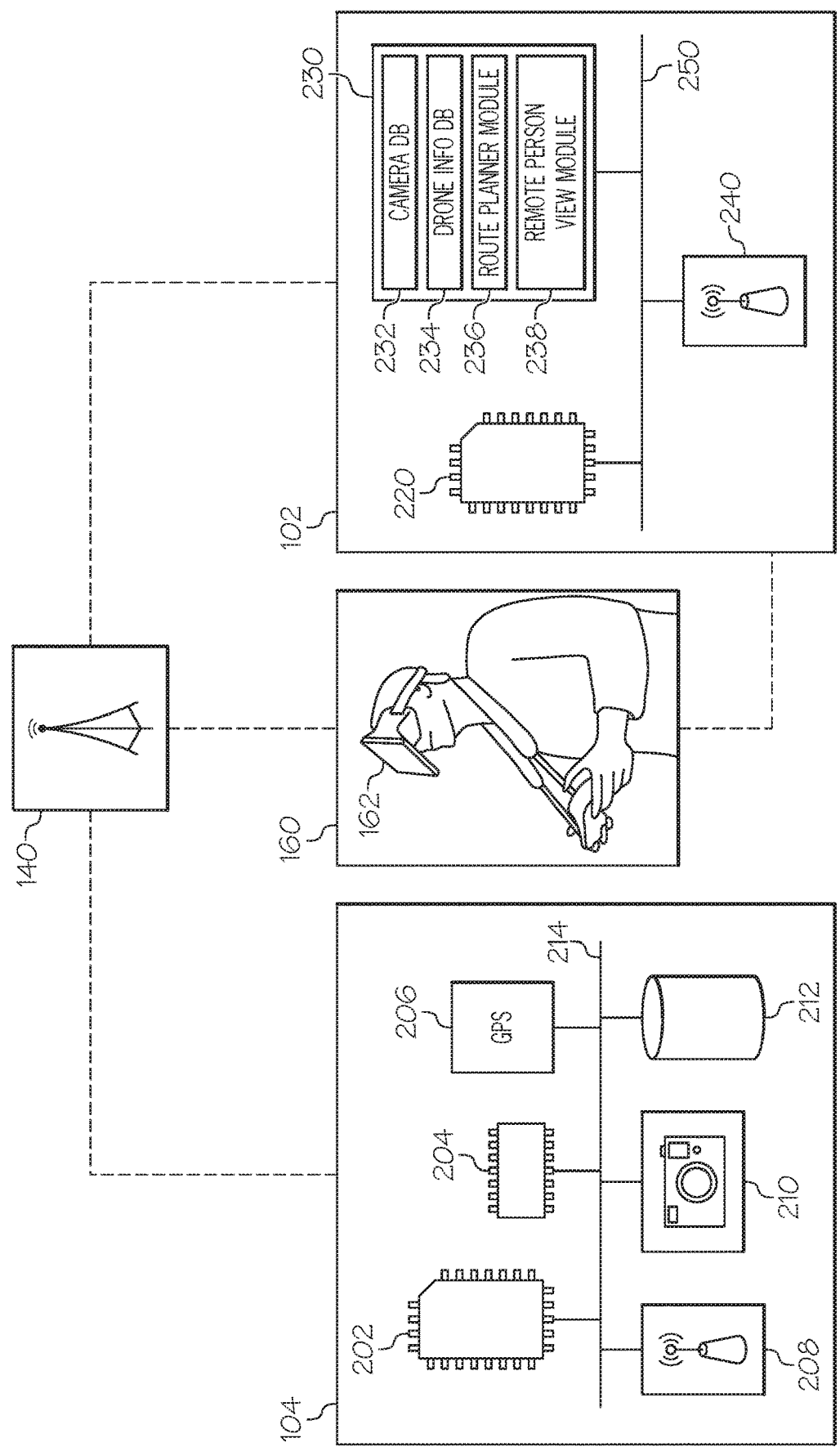
FIG. 2 depicts schematic diagrams of the system for generating a view of an unmanned aerial vehicle using camera sensor networks, according to one or more embodiments shown and described herein.

FIG. 2 depicts schematic diagrams of the system for generating a view of an unmanned aerial vehicle using camera sensor networks, according to one or more embodiments shown and described herein.

The unmanned aerial vehicle 104 includes one or more processors 202, one or more memory modules 204, a satellite antenna 206, a network interface hardware 208, one or more cameras 210, and a beacon device 212.

Each of the one or more processors 202 of the unmanned aerial vehicle 104 may be any device capable of executing machine readable instructions. Accordingly, each of the one or more processors 202 may be a controller, an integrated circuit, a microchip, a computer, or any other computing device. Each of the one or more processors 202 is communicatively coupled to the other components of the unmanned aerial vehicle 104 by the communication path 214. Accordingly, the communication path 214 may communicatively couple any number of processors with one another, and allow the components coupled to the communication path 214 to operate in a distributed computing environment. Specifically, each of the components may operate as a node that may send and/or receive data.

Each of the one or more memory modules 204 of the unmanned aerial vehicle 104 is coupled to the communication path 214 and communicatively coupled to the one or more processors 202. Each of the one or more memory modules 204 may comprise RAM, ROM, flash memories, hard drives, or any device capable of storing machine readable instructions such that the machine readable instructions can be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the one or more processors 202, or assembly language, object-oriented programming (OOP), scripting languages, microcode, etc., that may be compiled or assembled into machine readable instructions and stored in the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The one or more memory modules 204 may include the origin and destination of the unmanned aerial vehicle 104, and an assigned route between the origin and the destination received from the edge server 140 or the cloud server 102. The one or more processors 202 may operate one or more electric motors of the unmanned aerial vehicle 104 to follows the assigned route.

Still referring to FIG. 2, a satellite antenna 206 is coupled to the communication path 214 such that the communication path 214 communicatively couples the satellite antenna 206 to other modules of the unmanned aerial vehicle 104. The satellite antenna 206 is configured to receive signals from global positioning system satellites. Specifically, in one embodiment, the satellite antenna 206 includes one or more conductive elements that interact with electromagnetic signals transmitted by global positioning system satellites. The received signal is transformed into a data signal indicative of the location (e.g., latitude, longitude, and altitude) of the satellite antenna 206 or an object positioned near the satellite antenna 206, by the one or more processors 202. The one or more memory modules 204 may include instructions for transmitting the location received by the satellite antenna 206 to the edge device 140 or the cloud server 102.

Still referring to FIG. 2, the network interface hardware 208 is coupled to the communication path 214 and communicatively coupled to the one or more processors 202. The network interface hardware 208 may be any device capable of transmitting and/or receiving data via a network. Accordingly, the network interface hardware 208 can include a communication transceiver for sending and/or receiving any wired or wireless communication. For example, the network interface hardware 208 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 208 includes hardware configured to operate in accordance with the Bluetooth wireless communication protocol. In other embodiments, the network interface hardware 208 includes hardware configured to operate in accordance with a wireless communication protocol other than Bluetooth. The network interface hardware 208 of the unmanned aerial vehicle 104 may communicate with the edge server 140 or the cloud server 102.

Still referring to FIG. 2, one or more cameras 210 are coupled to the communication path 214 such that the communication path 214 communicatively couples the one or more cameras 210 to other modules of the unmanned aerial vehicle 104. Each of the one or more cameras 210 may be any device having an array of sensing devices (e.g., pixels) capable of detecting radiation in an ultraviolet wavelength band, a visible light wavelength band, or an infrared wavelength band. Each of the one or more cameras 210 may have any resolution. The one or more cameras 210 may include an omni-directional camera, or a panoramic camera. In some embodiments, one or more optical components, such as a mirror, fish-eye lens, or any other type of lens may be optically coupled to at least one of the one or more cameras 210. The one or more cameras 210 may be used to capture an image of another unmanned aerial vehicle.

Still referring to FIG. 2, the communication path 214 may be formed from any medium that is capable of transmitting a signal such as, for example, conductive wires, conductive traces, optical waveguides, or the like. Moreover, the communication path 214 may be formed from a combination of mediums capable of transmitting signals. In one embodiment, the communication path 214 comprises a combination of conductive traces, conductive wires, connectors, and buses that cooperate to permit the transmission of electrical data signals to components such as processors, memories, sensors, input devices, output devices, and communication devices. Accordingly, the communication path 214 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 214 communicatively couples the various components of the unmanned aerial vehicle 104. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 2, a beacon device 212 is coupled to the communication path 214 and communicatively coupled to the one or more processors 202. The beacon device 212 may transmits a wireless beacon signal to devices nearby. The beacon signal may include identification information about the unmanned aerial vehicle 104. For example, the imaging device 114 shown in FIG. 1 receives the wireless beacon signal from the unmanned aerial vehicle 104 and identifies the unmanned aerial vehicle 104.

Now referring to the cloud server 102, the one or more processors 220 may be processors similar to the one or more processors 202 described above. The one or more memory modules 230 may be memories similar to the one or more memory modules 204 described above. The network interface hardware 240 may be an interface hardware similar to the network interface hardware 208 described above. The communication path 250 may be a communication path similar to the communication path 214 described above. The one or more processors 220 in combination of one or more memory modules 230 may operate as an electronic control unit for the cloud server 102.

The one or more memory modules 230 includes a camera database 232, an unmanned aerial vehicle information database 234, a route planner module 236, and a remote person view module 238. The camera database 232 stores locations and specifications of imaging devices. The imaging devices may include mobile imaging devices, e.g., imaging devices of mobile phones, imaging devices of unmanned aerial vehicles, imaging devices of vehicles, and the like. In addition, the imaging devices may include imaging devices at fixed locations, e.g., imaging devices at traffic lights, imaging devices of security cameras, imaging devices of roadside units. For mobile imaging devices, the camera database 232 may include predicted locations of the mobile imaging devices at a particular time. For the imaging devices at fixed locations, the locations of the imaging devices are stored in the camera database 232. The specification of the imaging devices include angle of view, resolution, and a viewing distance of each imaging devices.

The unmanned aerial vehicle information database 234 may include identifications of unmanned aerial vehicles, and origin and destination information for each unmanned aerial vehicle. The origin and destination of each unmanned aerial vehicle may be received from each of the unmanned aerial vehicles. As another example, a user of the unmanned aerial vehicle may transmit the origin and destination of the unmanned aerial vehicle to the cloud server 102 by inputting the origin and destination on a controller for the unmanned aerial vehicle.

The route planner module 236 may determine a route for each unmanned aerial vehicle based on information stored in the camera database 232 and the unmanned aerial vehicle information database 234. For example, for the unmanned aerial vehicle 104, based on the origin and the destination of the unmanned aerial vehicle 104 and locations of imaging devices between the origin and destination stored in the camera database 232, a route is planned such that the unmanned aerial vehicle 104 following the route is constantly captured by at least one of the imaging devices.

The remote person view module 238 provides a view of an unmanned aerial vehicle to the user 160 of the unmanned aerial vehicle or the wearable device 163 of the user 160. In embodiments, the remote person view module 238 may receive captured images of an unmanned aerial vehicle 104 from imaging devices and transmit the captured images to the user 160 or the wearable device 163 of the user. In some embodiments, the remote person view module 238 may synthesize captured images including the unmanned aerial vehicle 104 and transmit the synthesized images to the user 160. In some embodiments, the remote person view module 238 may instruct each imaging devices to directly communicate with the user 160 or the wearable device 163 of the user 160. For example, the remote person view module 238 may instruct the imaging device 114 to transmit captured images of the unmanned aerial vehicle 104 to the user 160. As the unmanned aerial vehicle 104 moves away from the imaging device 114 and approaches the imaging device 116, the remote person view module 238 may instruct the imaging device 116 to transmit captured images of the unmanned aerial vehicle 104 to the user 160. In some embodiments, both the imaging device 114 and the imaging device 116 may transmit the captured images to the edge server 140, and the edge server 140 may combine or stitch the captured images to obtain an enhanced view of the unmanned aerial vehicle 104. Then, the edge server 140 may forward the combined or stitched images to the user 160.

Each of the route planner module 236 and the remote person view module 238 may be a program module in the form of operating systems, application program modules, and other program modules stored in one or more memory modules 230. In some embodiments, the program module may be stored in a remote storage device that may communicate with the cloud server 102. Such a program module may include, but is not limited to, routines, subroutines, programs, objects, components, data structures, and the like for performing specific tasks or executing specific data types as will be described below.

The edge server 140 may include similar components as the cloud server 102. For example, the edge server 140 may include one or more processors, one or more memory modules, and a network hardware interface. The one or more memory modules may include a camera database, an unmanned aerial vehicle information database, a route planner module, and a remote person view module, similar to the one or more memory modules 230 of the cloud server 102.

FIG. 3 depicts a handover between camera sensor networks, according to one or more embodiments shown and described herein. In FIG. 3, at time $t=t_0$, the unmanned aerial vehicle 104 is in an area covered by the first collaborative camera sensor network 110. The first collaborative camera sensor network 110 includes a plurality of imaging devices. For example, the first collaborative camera sensor network 110 includes imaging devices 112 and 114 of moving vehicles, and road-side imaging devices 116, 118, and 119. The second collaborative camera sensor network 120 includes imaging devices 122, 124, 126, and 128 of moving vehicles, and road-side imaging devices 132, 134, 136, 138, and 139.

When the unmanned aerial vehicle 104 is within the area covered by the camera sensor network 110, the imaging device 114 may initiate capturing of the unmanned aerial vehicle 104 as the unmanned aerial vehicle 104 travels following the route 166. The imaging device 114 may constantly transmit captured images to the edge server 140 which in turn transmits the images to the cloud server 102 or to the user 160 (e.g., a wearable device 163 of the user 160). In some embodiments, the imaging device 114 may transmit captured images to the cloud server 102 which in turn transmits the captured images to the user 160.

When the unmanned aerial vehicle 104 moves out of the area covered by the camera sensor network 110, i.e., none of the imaging devices of the collaborative camera sensor network 120 is capable of capturing the image of the unmanned aerial vehicle 104, hand overring to another camera sensor network may be performed. For example, at time $t=t_1$, the unmanned aerial vehicle 104 moves out of the area covered by the camera sensor network 110. The unmanned aerial vehicle 104 is now within an area covered by the camera sensor network 120, and one of the imaging devices, e.g., the imaging device 124, may capture images of the unmanned aerial vehicle 104 and transmit the images to the edge server 150 which in turn transmits the images to the cloud server 102 or to the user 160. In this regard, a handover between camera sensor networks 110 and 120 is implemented as the unmanned aerial vehicle 104 travels along the route 166.

FIG. 4 depicts an exemplary scenario where an unmanned aerial vehicle moves out of camera sensor networks, according to one or more embodiments shown and described herein. In FIG. 4, the unmanned aerial vehicle 104 moves from a position $P_1$ to a position $P_2$. When the unmanned aerial vehicle 104 is at the position $P_1$, one of the imaging devices, for example, the imaging device 114, captures images of the unmanned aerial vehicle 104 and transmits the captured images to the user 160 via the edge server 140 and/or the cloud server 102. When the unmanned aerial vehicle 104 moves to the position $P_2$, the unmanned aerial vehicle 104 is out of areas covered by the camera sensor networks 110 and 120. Thus, none of the imaging devices of the camera sensor network 110 and 120 is able to capture images of the unmanned aerial vehicle 104. The edge server 140 or 150 may transmit a notification to the cloud server 102 that the unmanned aerial vehicle 104 is out of areas covered by available camera sensor networks, e.g., camera sensor networks 110 and 120. The cloud server 102 may then identify the current location of the unmanned aerial vehicle 104 and instruct an unmanned aerial vehicle 410 to move towards the current location of the unmanned aerial vehicle 104. The unmanned aerial vehicle 410 includes an imaging device 412 that captures images of the unmanned aerial vehicle 104. The unmanned aerial vehicle 410 may transmit captured images to the user 160 via an edge server proximate to the unmanned aerial vehicle 410 and/or the cloud server 102.

In embodiments, the unmanned aerial vehicle 410 follows the unmanned aerial vehicle 104 and continuously captures the images of the unmanned aerial vehicle 410. In some embodiments, the unmanned aerial vehicle 410 may lead the unmanned aerial vehicle 104 to move back to the area covered by the camera sensor network 110 or 120. For example, the unmanned aerial vehicle 410 may provide a direction to the area covered by the camera sensor network 110 or 120 to the unmanned aerial vehicle 104. In some embodiments, the cloud server 102 may provide a direction to the area covered by the camera sensor network 110 or 120 to the unmanned aerial vehicle 104.

FIG. 5 is a flowchart for obtaining a view of an unmanned aerial vehicle using camera sensor networks, according to one or more embodiments shown and described herein.

In step 510, a system identifies an unmanned aerial vehicle. In embodiments, the unmanned aerial vehicle may be identified by an edge server based on wireless beaconing submitted from the unmanned aerial vehicle. For example, by referring to FIG. 1, the edge server 140 or one of the imaging devices in the camera sensor network 110 may receive a wireless beaconing signal from the unmanned aerial vehicle 104 and identify the unmanned aerial vehicle 104. In another embodiment, an unmanned aerial vehicle may be identified based on image-based depth estimation by imaging devices in the camera sensor network 110. For example, by referring to FIG. 1, one of the imaging devices in the camera sensor network 110 may identify the unmanned aerial vehicle 104 using image-based depth estimation.

In step 520, the system obtains an origin and a destination of the identified unmanned aerial vehicle. In embodiments, the unmanned aerial vehicle may communicate its origin and destination to an edge server or a cloud server. For example, by referring to FIG. 1, the unmanned aerial vehicle 104 may communicate information about the origin 162 and the destination 164 to the edge server 140 or the cloud server 102 along with the identification of the unmanned aerial vehicle 104. In some embodiments, the origin and destination of the unmanned aerial vehicle in association with the identification of the unmanned aerial vehicle may be pre-stored in the cloud server 102. For example, the cloud server 102 may receive and store the origin and destination of the unmanned aerial vehicle from a user of the unmanned aerial vehicle along with the identification of the unmanned aerial vehicle.

In step 530, the system determines a group of imaging devices based on a route between the origin and the destination of the unmanned aerial vehicle. In embodiments, the cloud server 102 may determine a route for the unmanned aerial vehicle based on the origin and the destination of the unmanned aerial vehicle. For example, by referring to FIG. 6, the cloud server 102 may receive the origin 162 and the destination 164 of the unmanned aerial vehicle 104. The cloud server 102 may determine a route including a path 602, a path 604, and a path 606. In embodiments, the cloud server 102 may determine imaging devices that are available for capturing images of the unmanned aerial vehicle 104 following the route.

The cloud server 102 or a corresponding edge server may determine whether imaging devices are available for capturing images capturing images of the unmanned aerial vehicle based on various factors, and select the available imaging devices as the group of imaging devices. For example, the cloud server 102 or a corresponding edge server may determine whether imaging devices are available for capturing images of the unmanned aerial vehicle based on the proximity of the imaging devices to the route of the unmanned aerial vehicle.

As another example, the cloud server 102 or a corresponding edge server may determine whether imaging devices are available for capturing images of the unmanned aerial vehicle based on expected locations of mobile imaging devices. The mobile imaging devices may include, but is not limited to, an imaging device of a mobile phone, an imaging device of another unmanned aerial vehicle, or an imaging device of a vehicle. The cloud server 102 or a corresponding edge server may determine the expected locations of the mobile imaging devices when the unmanned aerial vehicle 104 follows the route including the paths 602, 604, 606 and determine whether the expected locations of the mobile imaging devices are proximate to the route. Specifically, by referring to FIG. 6, the cloud server 102 may determine the expected location of the imaging device of another unmanned aerial vehicle 650 when the unmanned aerial vehicle 104 follows the path 602. If the expected location 652 of another unmanned aerial vehicle is proximate to the path 602 when the unmanned aerial vehicle 104 follows the path 602, then the cloud server 102 may determine that the imaging device of another unmanned aerial vehicle 650 is available for capturing images of the unmanned aerial vehicle 104.

As another example, the cloud server 102 or a corresponding edge server may determine whether imaging devices are available for capturing images of the unmanned aerial vehicle based on face directions of the imaging devices. The face directions of imaging devices may be stored in the cloud server, e.g., in the camera database 232 in FIG. 2 or in a corresponding edge server. The cloud server 102 or a corresponding edge server may determine whether an imaging device is facing the unmanned aerial vehicle 104 following the route based on the face direction of the imagine device and the moving direction of the unmanned aerial vehicle 104 following the route. If it is determined that the imaging device is facing the unmanned aerial vehicle 104 when the unmanned aerial vehicle 104 follows the route, the cloud server 102 may determine that the imaging device is available for capturing images of the unmanned aerial vehicle 104. Specifically, by referring to FIG. 6, the imaging device 610-1 is facing the unmanned aerial vehicle 104 when the unmanned aerial vehicle 104 follows the path 602. Thus, the cloud server 102 or a corresponding edge server may determine that the imaging device 610-1 is available for capturing images of the unmanned aerial vehicle 104. In contrast, the imaging device 610-2 is not facing the unmanned aerial vehicle 104 when the unmanned aerial vehicle 104 follows the path 602. Thus, the cloud server 102 or a corresponding edge server may determine that the imaging device 610-2 is not available for capturing images of the unmanned aerial vehicle 104.

As another example, the cloud server 102 may determine whether imaging devices are available for capturing images of the unmanned aerial vehicle based on whether the imaging devices are registered into the system. For example, if an imaging device 620-1 has opted in to participate a camera sensor network, e.g., a camera sensor network 620 in FIG. 6, the cloud server 102 may determine that the imaging device 620-1 is available for capturing images of the unmanned aerial vehicle 104. As another example, if an imaging device 620-2 has opted out from participating the camera sensor network, then the cloud server 102 may determine that the imaging device 620-2 is not available for capturing images of the unmanned aerial vehicle 104.

Figure 6:
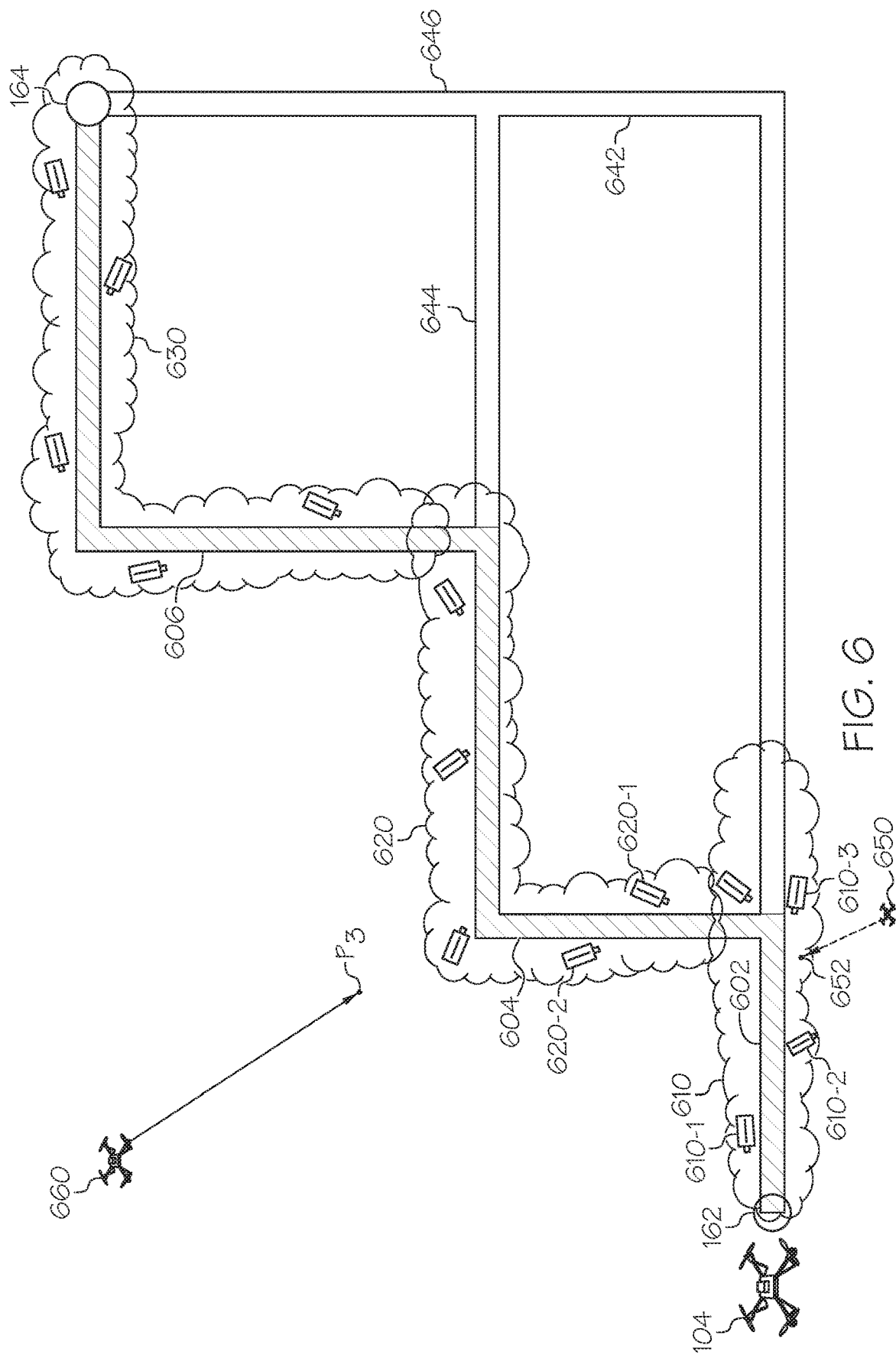
FIG. 6 depicts exemplary camera sensor networks, according to one or more embodiments shown and described herein.

In embodiments, one or more camera sensor networks are formed based on the imaging devices available for capturing images of the unmanned aerial vehicle. For example, by referring to FIG. 6, a camera sensor network 610, a camera sensor network 620, and a camera sensor network 630 are formed. Each of the camera sensor networks 610, 620, and 630 includes one or more imaging devices available for capturing images of the unmanned aerial vehicle 104. While FIG. 6 depict three different camera sensor networks, more than or less than three camera sensor networks may be formed depending on distances among the imaging devices.

In embodiments, the system may provide incentives to the image devices available for capturing images of the unmanned aerial vehicles such that more imaging devices are opted in to participate in a camera sensor network. The incentives may be determined based on at least one of a distance between the route and each imaging device, a view angle of each imaging device, or a viewing distance of each imaging device.

Referring back to FIG. 6, in step 540, the system determines whether the unmanned aerial vehicle is within a view of at least one of the group of imaging devices. By referring to FIG. 6, the cloud server 102 or an edge server for one of the camera sensor networks 610, 620, 630 may determine whether the unmanned aerial vehicle 104 is within a view of at least one of the group of imaging devices. For example, the cloud server 102 may receive the current location of the unmanned aerial vehicle 104 and determine whether the current location of the unmanned aerial vehicle 104 is within view of the imaging devices of the camera sensor networks 610, 620, and 630.

If it is determined that the unmanned aerial vehicle 104 is within a view of at least one of the group of imaging devices in step 540, the system obtains a view of the unmanned aerial vehicle following the route based on images of the unmanned aerial vehicle captured by the group of imaging devices in step 550. For example, by referring to FIG. 6, when the unmanned aerial vehicle 104 is at the origin 162, the imaging device 610-1 may initiate capturing images of the unmanned aerial vehicle 104. The imaging device 610-1 may transmit the captured images to an edge server for the camera sensor network 610 or the cloud server 102 shown in FIG. 1 which in turn transmits the captured images to the device 163 of the user 160. As the unmanned aerial vehicle 104 passes the imaging device 610-1, the imaging device 610-3 may capture images of the unmanned aerial vehicle 104 and transmit the captured images to the edge server or the cloud server. As the unmanned aerial vehicle 104 follows the path 604, the imaging device 620-1 may capture images of the unmanned aerial vehicle 104 and transmit the captured images to the edge server or the cloud server. At this time, a hand over is implemented between the camera sensor network 610 and the camera sensor network 620. In this regard, at least one imaging device in the camera sensor networks 610, 620, 630 captures images of the unmanned aerial vehicle 104 in real time and transmits the captured images to the user 160 such that the user 160 can see the real time view of the unmanned aerial vehicle 104.

In some embodiments, the imaging devices of the camera sensor networks may store captured images of the unmanned aerial vehicle for a predetermined time. The imaging devices may pre-process of captured images and store images that include the unmanned aerial vehicle for a predetermined time.

In some embodiments, the edge server or the cloud server may determine a misbehaving imaging device among the group of the imaging devices. The edge server or the cloud server may compare images of the unmanned aerial vehicle captured by the group of imaging devices. The edge server or the cloud server may identify a misbehaving imaging device of the group of imaging devices that provides images not congruent with images provided by other imaging devices of the group of imaging devices. The edge server or cloud server may compare the images captured by the imaging device 610-1, 620-1, 620-2 and determine that the image provided by the imaging device 620-2 is not congruent with the imagines provided by the imaging devices 610-1 and 620-1. For example, the imaging device 620-2 may transmit an image of the unmanned aerial vehicle 104 the location of which does not match with the location of the unmanned aerial vehicle 104 in the images captured by the imaging devices 610-1 and 620-1. As another example, the imaging device 620-2 may transmit images with no unmanned aerial vehicle while the imaging devices 610-1 and 620-1 transmit images including the unmanned aerial vehicle 104. Then, the edge server or the cloud server may discard the images provided by the misbehaving imaging device, e.g., the imaging device 620-2.

If it is determined that the unmanned aerial vehicle 104 is not within a view of at least one of the group of imaging devices in step 540, the system dispatches another unmanned aerial vehicle proximate to the unmanned aerial vehicle in response to the unmanned aerial vehicle being outside the view of the group of imaging devices in step 560. For example, when the unmanned aerial vehicle 104 moves to the position $P_3$ in FIG. 6, the unmanned aerial vehicle 104 is out of areas covered by the camera sensor networks 610, 620, and 630. Thus, none of the imaging devices of the camera sensor networks 610, 620, and 630 is able to capture images of the unmanned aerial vehicle 104. Edge servers for the camera sensor networks may transmit a notification to the cloud server 102 that the unmanned aerial vehicle 104 is out of areas covered by the camera sensor networks 610, 620, and 630. The cloud server 102 may then instruct a mobile imaging device, e.g., an unmanned aerial vehicle 660 to move towards the unmanned aerial vehicle 104. The unmanned aerial vehicle 660 includes an imaging device that captures images of the unmanned aerial vehicle 104. The unmanned aerial vehicle 660 may transmit captured images to the user 160 via an edge server proximate to the unmanned aerial vehicle 660 and/or the cloud server 102.

Figure 7:
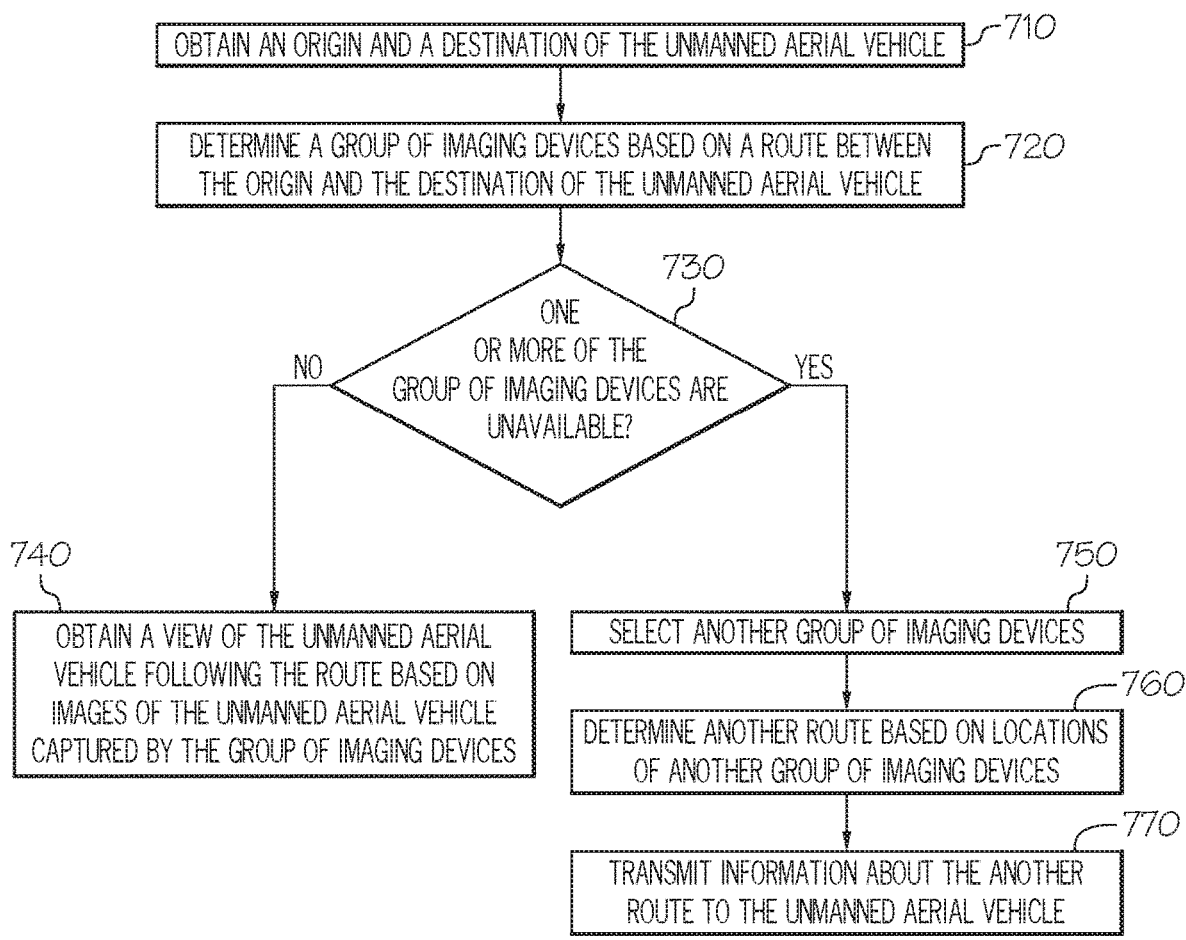
FIG. 7 is a flowchart for obtaining a view of an unmanned aerial vehicle using camera sensor networks, according to another embodiment shown and described herein.

FIG. 7 is a flowchart for obtaining a view of an unmanned aerial vehicle using camera sensor networks, according to another embodiment shown and described herein.

In step 710, the system obtains an origin and a destination of an unmanned aerial vehicle. The unmanned aerial vehicle may be previously identified by an edge server or imaging devices as described in step 510 above. In embodiments, the unmanned aerial vehicle may communicate its origin and destination to an edge server or a cloud server. In some embodiments, the origin and destination of the unmanned aerial vehicle in association with the identification of the unmanned aerial vehicle may be pre-stored in the cloud server 102.

In step 720, the system determines a group of imaging devices based on a route between the origin and the destination of the unmanned aerial vehicle. In embodiments, the cloud server 102 may determine a route for the unmanned aerial vehicle based on the origin and the destination of the unmanned aerial vehicle. For example, by referring to FIG. 6, the cloud server 102 may receive the origin 162 and the destination 164 of the unmanned aerial vehicle 104. The cloud server 102 may determine a route including a path 602, a path 604, and a path 606. In embodiments, the cloud server 102 may determine imaging devices that are available for capturing images of the unmanned aerial vehicle 104 following the route.

In step 730, the system determines whether one or more of the group of imaging devices are unavailable. By referring to FIG. 6, the cloud server 102 or an edge server for one of the camera sensor networks 610, 620, 630 may determine whether one or more of the group of imaging devices are unavailable.

If it is determined that the group of imaging devices are available at step 730, the system obtains a view of the unmanned aerial vehicle following the route based on images of the unmanned aerial vehicle captured by the group of imaging devices in step 740. For example, by referring to FIG. 6, when the unmanned aerial vehicle 104 is at the origin 162, the imaging device 610-1 initiates capturing images of the unmanned aerial vehicle 104. The imaging device 610-1 may transmit the captured images to an edge server for the camera sensor network 610 or the cloud server 102 shown in FIG. 1 which in turn transmits the captured images to the device 163 of the user 160. As the unmanned aerial vehicle 104 passes the imaging device 610-1, the imaging device 610-3 may capture images of the unmanned aerial vehicle 104 and transmit the captured images to the edge server or the cloud server. As the unmanned aerial vehicle 104 follows the path 604, the imaging device 620-1 may capture images of the unmanned aerial vehicle 104 and transmit the captured images to the edge server or the cloud server. In this regard, at least one imaging device in the camera sensor networks 610, 622, 630 captures images of the unmanned aerial vehicle 104 in real time and transmits the captured images to the user 160 such that the user 160 can see the real time view of the unmanned aerial vehicle 104.

Figure 8:
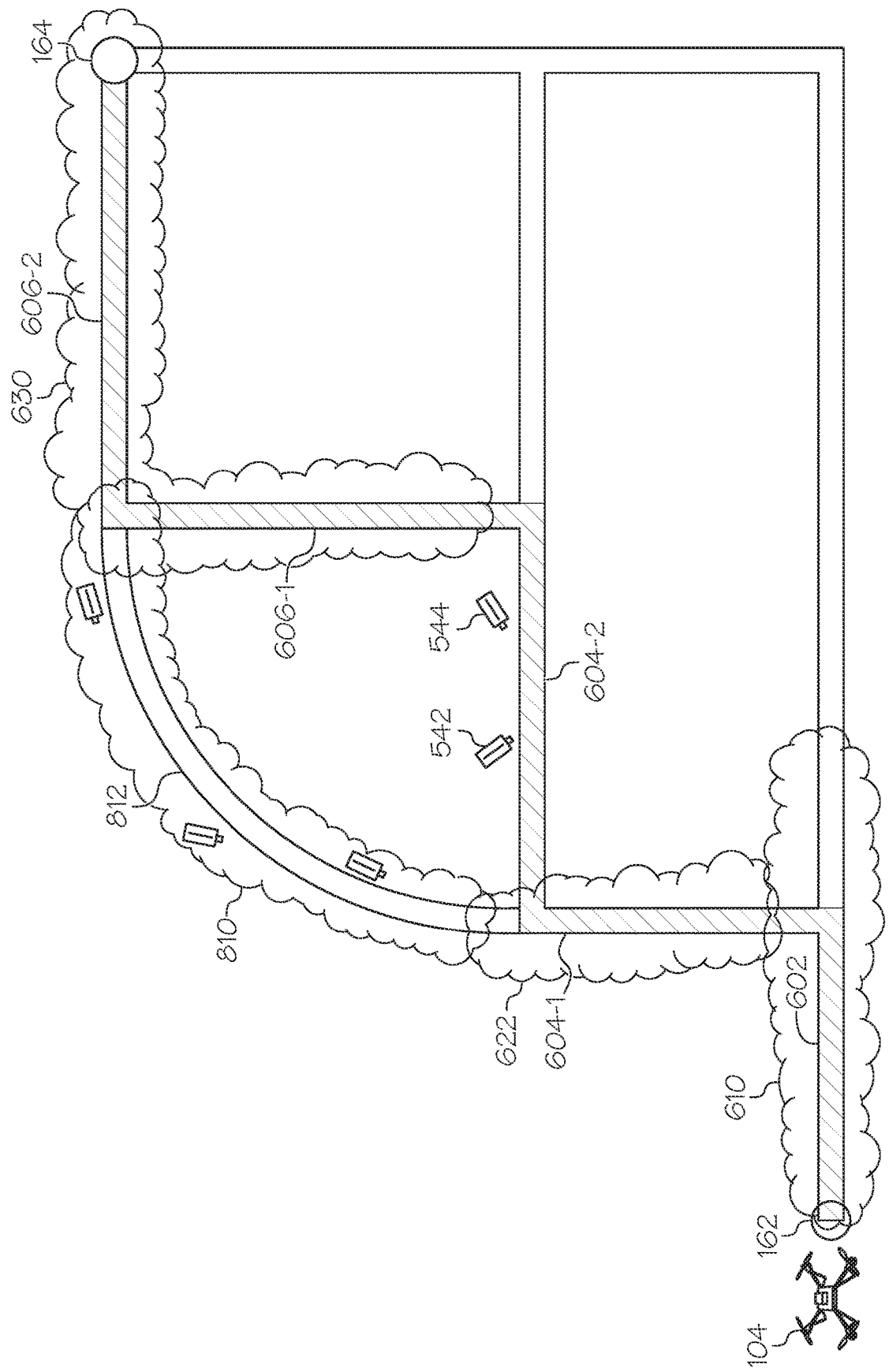
FIG. 8 depicts exemplary camera sensor networks, according to one or more embodiments shown and described herein.

If it is determined that one or more of the group of imaging devices are unavailable at step 730, the system may select another group of imaging devices in step 750. For example, by referring to FIG. 8, the imaging devices 542 and 544 may not be available for capturing images of the unmanned aerial vehicle 104. For example, the imaging devices 542 and 544 may not operate properly. As another example, the imaging devices 542 and 544 may opt out from the camera sensor network 620. As another example, the imaging devices 542 and 544 may be mobile imaging devices and move out of areas covered by the camera sensor network 620 in FIG. 6. The camera sensor network 620 in FIG. 6 may change to the camera sensor network 622 in FIG. 8 due to unavailability of the imaging devices 542 and 544. In this case, the route of the unmanned aerial vehicle 104 may not be continuously monitored by the camera sensor networks 610, 622, and 630 because of area not covered by any of the camera sensor networks 610, 622, and 630. Then, the system may select another group of imaging devices, for example, imaging devices that constitute a camera sensor network 810 in FIG. 8.

In step 760, the system determines another route for the unmanned aerial vehicle based on locations of another group of imaging devices. For example, by referring to FIG. 8, based on the locations of imaging devices for the camera sensor networks 810, a route including the path 602, the path 604-1, a path 812, and the path 606-2 is selected for the unmanned aerial vehicle 104.

In step 770, the system transmits information about another route to the unmanned aerial vehicle. In embodiments, the cloud server 102 or an edge server proximate to the unmanned aerial vehicle 104 may transmit information about another route, e.g., the route including the path 602, the path 604-1, the path 812, and the path 606-2 to the unmanned aerial vehicle 104. Then, the imaging devices of the camera sensor networks 610, 622, 810, and 630 may capture the unmanned aerial vehicle 104 following the route.

Figure 9:
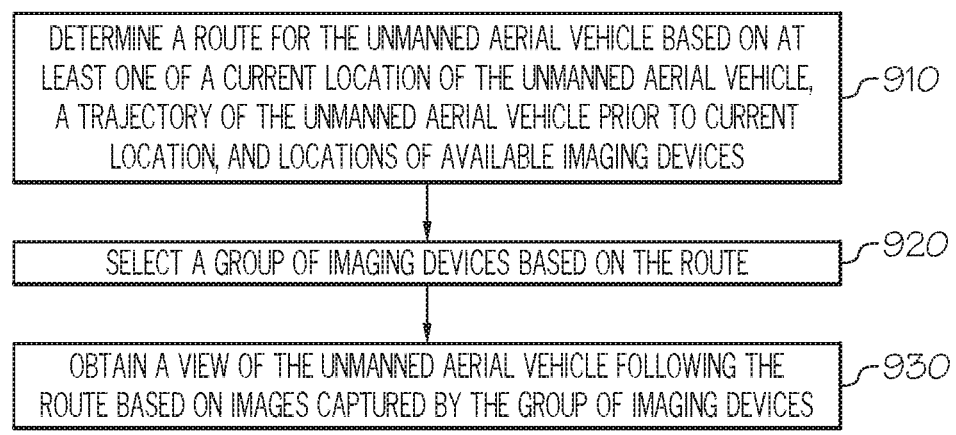
FIG. 9 depicts a flowchart for obtaining a view of an unmanned aerial vehicle using camera sensor networks when the origin and destination of the unmanned aerial vehicle is not known to a system, according to another embodiment shown and described herein.

FIG. 9 depicts a flowchart for obtaining a view of an unmanned aerial vehicle using camera sensor networks when the origin and destination of the unmanned aerial vehicle is not known to a system, according to another embodiment shown and described herein.

Figure 10B:
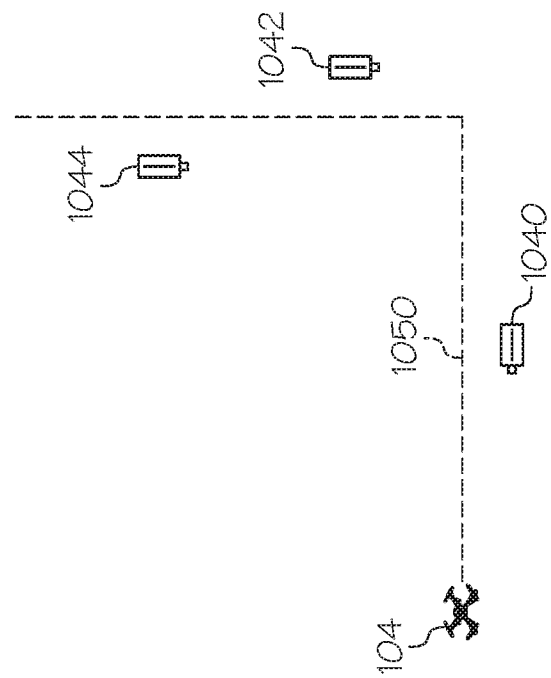
FIG. 10B depicts exemplary camera sensor networks, according to one or more embodiments shown and described herein.
Figure 10A:
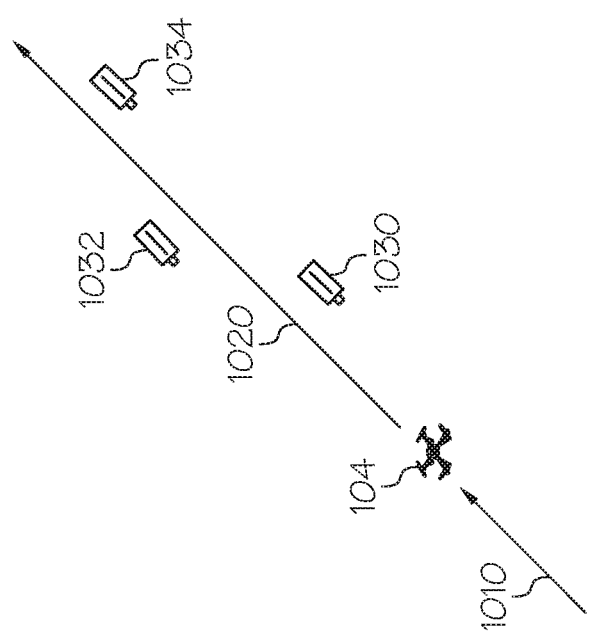
FIG. 10A depicts exemplary camera sensor networks, according to one or more embodiments shown and described herein.

In step 910, the system determines a route for the unmanned aerial vehicle based on at least one of a current location of the unmanned aerial vehicle, a trajectory of the unmanned aerial vehicle prior to current location, and locations of available imaging devices. In embodiments, the origin and destination of the unmanned aerial vehicle may not be known to the system. By referring to FIG. 10A, the future route 1020 of the unmanned aerial vehicle may be predicted based on the trajectory 1010 of the unmanned aerial vehicle prior to its current location. For example, one or more imaging devices may monitor movement of the unmanned aerial vehicle 104. Based on the monitored movement of the unmanned aerial vehicle 104 including a moving direction, speed, etc., the edge server or cloud server may predict the route 1020 of the unmanned aerial vehicle 104 in real time.

In step 920, the system may select a group of imaging devices based on the predicted route. For example, the cloud server 102 or the edge server proximate to the unmanned aerial vehicle 104 may select a group of imaging devices proximate to the predicted route, e.g., imaging devices 1030, 1032, 1034 in FIG. 10A.

In step 930, the system obtains a view of the unmanned aerial vehicle following the route based on images captured by the group of imaging devices. For example, by referring to FIG. 10A, the imaging device 1030 initiates capturing images of the unmanned aerial vehicle 104 following the predicted route 1020. The imaging device 1030 may transmit the captured images to an edge server or the cloud server 102 shown in FIG. 1 which in turn transmits the captured images to the device 163 of the user 160. As the unmanned aerial vehicle 104 passes the imaging device 1030, the imaging device 1032 may capture images of the unmanned aerial vehicle 104 and transmit the captured images to the edge server or the cloud server. The predicted route of the unmanned aerial vehicle 104 may change in real time, and the system may select different group of imaging devices based on the changed predicted route.

In some embodiments, the system may determine a route for the unmanned aerial vehicle based on locations of available imaging devices. For example, by referring to FIG. 10B, the origin and destination of the unmanned aerial vehicle is not known to the system. Then, the system may determine the locations of available imaging devices that are within a certain distance from the current location of the unmanned aerial vehicle 104, e.g., imaging devices 1040, 1042, and 1044. Based on the locations of the imaging devices 1040, 1042, 1044, the system may determine the route 1050 for the unmanned aerial vehicle 104, and transmit the route 1050 to the unmanned aerial vehicle 104. The imaging devices 1040, 1042, and 1044 may capture images of the unmanned aerial vehicle 104 following the route 1050 and transmit captured images to the user 160 via an edge server or the cloud server.

It should be understood that embodiments described herein are directed to methods and systems for obtaining a view of an unmanned aerial vehicle. The method includes obtaining an origin and a destination of the unmanned aerial vehicle, determining a group of imaging devices based on a route between the origin and the destination of the unmanned aerial vehicle, and obtaining a view of the unmanned aerial vehicle following the route based on images of the unmanned aerial vehicle captured by the group of imaging devices.

The group of imaging devices form a collaborative camera sensor network. The collaborative camera sensor network identifies an unmanned aerial vehicle and creates a human operator's view of the unmanned aerial vehicle. The route of the unmanned aerial vehicle is determined based on the availability of camera sensor networks. The route of the unmanned aerial vehicle may be changed based on the availability of imaging devices. Whenever the unmanned aerial vehicle moves out the camera sensor networks region, horizontal and/or vertical hand over may be performed between camera sensor networks as shown in FIG. 3 to continuously monitor the flight of the unmanned aerial vehicle. If the unmanned aerial vehicle is at a location not covered by the camera sensor networks, a special mission drone may be positioned proximate to the unmanned aerial vehicle as shown in FIG. 4. The image data obtained by the camera sensor networks is transferred to an edge server and/or a cloud server which transmits the captured images to a human operator.

According the present disclosure, not only the route of the unmanned aerial vehicle but also the selected cameras can be changed upon the availability of imaging devices. The imaging devices may be selected based on dynamic, static and/or predetermined metrics. Alternative imaging devices may be selected when there is short-term and/or long-term unavailability of participating imaging devices. According to the present disclosure, the unmanned aerial vehicle is continuously tracked and/or monitored via collaborative camera sensor networks and the first-person view of the unmanned aerial vehicle is constructed for a human operator.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for generating a view for an unmanned aerial vehicle, the method comprising:
    obtaining an origin and a destination of the unmanned aerial vehicle;
    determining a group of imaging devices based on a route between the origin and the destination of the unmanned aerial vehicle;
    determining whether the unmanned aerial vehicle is within a view of at least one of the group of imaging devices;
    instructing another vehicle to join the group of imaging devices to monitor the unmanned aerial vehicle in response to the unmanned aerial vehicle being outside views of the group of imaging devices; and
    obtaining a view of the unmanned aerial vehicle following the route based on images of the unmanned aerial vehicle captured by the group of imaging devices and the another vehicle.

2. The method of claim 1, wherein the group of imaging devices is determined based on at least one of locations of the group of imaging devices, predicted locations of the group of imaging devices, or specifications of the group of imaging devices.

3. The method of claim 1, wherein the specifications include at least one of an angle of view, resolution, or a viewing distance.

4. The method of claim 1, wherein:
    the group of imaging devices include one or more mobile imaging devices, and
    the one or more mobile imaging devices are expected to be proximate to the route when the unmanned aerial vehicle travels along the route.

5. The method of claim 4, wherein the one or more mobile imaging devices include at least one of an imaging device of a mobile phone, an imaging device of another unmanned aerial vehicle, or an imaging device of a vehicle.

6. The method of claim 1, wherein obtaining the origin and the destination of the unmanned aerial vehicle comprises:
    identifying the unmanned aerial vehicle; and
    retrieving the origin and the destination of the identified unmanned aerial vehicle.

7. The method of claim 1, further comprising:
    selecting another group of imaging devices in response to unavailability of one or more of the group of imaging devices proximate to the route;
    determining another route based on locations of the another group of imaging devices; and
    transmitting information about the another route to the unmanned aerial vehicle.

8. The method of claim 1, wherein the group of imaging devices includes at least one of a imaging device at a traffic light, an imaging device of a security camera, an imaging device of a roadside camera, an imaging device of a mobile phone, an imaging device of another unmanned aerial vehicle, or an imaging device of a vehicle.

9. The method of claim 1, further comprising:
    comparing images of the unmanned aerial vehicle captured by the group of imaging devices;
    identifying a misbehaving imaging device of the group of imaging devices that provides images not congruent with images provided by other imaging devices of the group of imaging devices; and
    discarding the images provided by the misbehaving imaging device.

10. The method of claim 1, wherein determining the group of imaging devices based on the route between the origin and the destination of the unmanned aerial vehicle comprises:
    determining information about availability of imaging devices based at least one of locations, predicted locations, and face directions of the imaging devices; and
    selecting the group of imaging devices based on the information about availability of imaging devices.

11. The method of claim 10, further comprising:
    providing incentives to the selected group of imaging devices.

12. The method of claim 11, wherein the incentives are determined based on at least one of a distance between the route and each imaging device, a view angle of each imaging device, or a viewing distance of each imaging device.

13. A system for generating a view for an unmanned aerial vehicle, the system comprising:
an electronic control unit configured to:
obtain an origin and a destination of the unmanned aerial vehicle;
determine a group of imaging devices based on a route between the origin and the destination of the unmanned aerial vehicle;
determine whether the unmanned aerial vehicle is within a view of at least one of the group of imaging devices;
instruct another vehicle to join the group of imaging devices to monitor the unmanned aerial vehicle in response to the unmanned aerial vehicle being outside views of the group of imaging devices;
receive images captured by the group of imaging devices and the another vehicle; and
obtain a view of the unmanned aerial vehicle following the route based on the received images.

14. The system of claim 13, wherein the electronic control unit is further configured to:
select another group of imaging devices in response to unavailability of one or more of the group of imaging devices proximate to the route;
determine another route based on locations of the another group of imaging devices; and
transmit information about the another route to the unmanned aerial vehicle.

15. The system of claim 13, wherein the electronic control unit is further configured to:
instruct the group of imaging devices to store the images for a predefined amount of time.

16. The system of claim 13, wherein the electronic control unit is further configured to:
determine whether the unmanned aerial vehicle is within a view of at least one of the group of imaging devices; and
transmit an alert in response to the unmanned aerial vehicle being outside views of the group of imaging devices.

17. A method for generating a view for an unmanned aerial vehicle, the method comprising:
determining a route for the unmanned aerial vehicle based on a current location of the unmanned aerial vehicle;
dynamically updating the route for the unmanned aerial vehicle based on locations of available imaging devices;
selecting a group of imaging devices among the available imaging devices based on the updated route; and
obtaining a view of the unmanned aerial vehicle following the updated route based on images captured by the group of imaging devices.

18. The method of claim 17, further comprising:
determining the route for the unmanned aerial vehicle further based on a trajectory of the unmanned aerial vehicle prior to the current location.

* * * * *

UNITED STATES PATENT AND TRADEMARK OFFICE
CERTIFICATE OF CORRECTION

PATENT NO. : 11,210,957 B2
APPLICATION NO. : 16/410134
DATED : December 28, 2021
INVENTOR(S) : Baik Hoh, Seyhan Ucar and Kentaro Oguchi It is certified that error appears in the above-identified patent and that said Letters Patent is hereby corrected as shown below:

On the Title Page

Column 2, item [56], Line 1, delete "Navot" and insert --Navot et al.--, therefor.

Column 2, item [56], Line 1, after "Feb. 16, 2017", insert --;--.

Page 2, Column 1, item [56], Line 4, delete "Hammond" and insert --Hammond et al.--, therefor.

Page 2, Column 1, item [56], Line 5, delete "Cheatham, III" and insert --Cheatham, III et al.--, therefor.

Page 2, Column 1, item [56], Line 6, delete "Cheatham, III" and insert --Cheatham, III et al.--, therefor.

Page 2, Column 1, Line 7, delete "Jesudason" and insert --Jesudason et al.--, therefor.

In the Claims

Column 16, Line(s) 36, Claim 8, before "imaging", delete "a" and insert --an--, therefor.

Signed and Sealed this
Twenty-sixth Day of July, 2022

Katherine Kelly Vidal
*Director of the United States Patent and Trademark Office*